(12) United States Patent
Tung

(10) Patent No.: US 9,935,927 B2
(45) Date of Patent: Apr. 3, 2018

(54) SYSTEM AND METHOD FOR LOW ENERGY DOUBLE AUTHENTICATION BETWEEN MOBILE DEVICE AND SERVER NODES

(71) Applicant: Quanta Computer Inc., Taoyuan (TW)

(72) Inventor: Yen-Ping Tung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 186 days.

(21) Appl. No.: 14/885,007

(22) Filed: Oct. 16, 2015

(65) Prior Publication Data

US 2017/0111346 A1    Apr. 20, 2017

(51) Int. Cl.
*H04L 29/06* (2006.01)
*H04W 12/06* (2009.01)
*H04W 4/00* (2018.01)

(52) U.S. Cl.
CPC ...... *H04L 63/0492* (2013.01); *H04L 63/0853* (2013.01); *H04W 4/008* (2013.01); *H04W 12/06* (2013.01)

(58) Field of Classification Search
CPC ... H04L 63/083; H04L 63/0492; H04W 12/06
USPC .......................................................... 726/9
See application file for complete search history.

(56) References Cited

U.S. PATENT DOCUMENTS

| 2012/0054498 A1* | 3/2012 | Rickman | ............... G06F 21/606 713/183 |
| 2013/0174252 A1* | 7/2013 | Weber | ................. G06F 21/6218 726/20 |

* cited by examiner

*Primary Examiner* — Brandon Hoffman
*Assistant Examiner* — Nega Woldemariam
(74) *Attorney, Agent, or Firm* — Nixon Peabody LLP; Eduardo J. Quinones; Zhou Lu

(57) ABSTRACT

Disclosed are systems, methods, and computer-readable storage media for Bluetooth low energy (BLE) double authentication between a mobile device and server nodes. A system using BLE authentication can receive at a mobile device, an identifier of a dongle attached to a server that enables wireless communication and can establish a wireless low energy connection with the dongle without paring. The system can receive a server identifier and can determine whether the server has previously been authenticated to yield a determination. When the determination is that the server has not previously been authenticated, the system can receive a baseband management controller username and a password. When the determination is that the server has previously been authenticated, the system can determine whether to perform a double authentication to yield a second determination. The system can perform the double authentication when the second determination indicates that the double authentication should be performed.

20 Claims, 7 Drawing Sheets

SYSTEM AND METHOD FOR LOW ENERGY DOUBLE AUTHENTICATION BETWEEN MOBILE DEVICE AND SERVER NODES

BACKGROUND

1. Technical Field

The present disclosure relates to computer security and more specifically to wireless low energy double authentication (such as Bluetooth low energy) between a mobile device and a server node.

2. Introduction

Bluetooth is a wireless technology standard for exchanging data over short distances, designed for low-power consumption. Applications of the Bluetooth technology include wireless communication between a mobile phone and a hands-free headset or a compatible car stereo system, wireless networking between PCs and wireless communication between PCs and I/O devices such as a mouse, keyboard and printer. Bluetooth low energy is a subset of classic Bluetooth and runs low energy applications off a coin (button) cell, allowing for the lowest possible cost.

Bluetooth low energy uses AES encryption to protect data packets in transit after device authentication. Traditional device authentication is performed by scanning for a Bluetooth low energy device and reading a Bluetooth low energy device unique identifier. When the unique identifier is not considered trusted, a valid password is required to establish a connection. When the unique identifier is considered trusted, a connection is established between devices. Because Bluetooth low energy is a form of wireless communication, security throughout the authentication process is a major concern.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for wireless low energy double authentication between a mobile device and server nodes. Wireless low energy double authentication is a solution that allows a system administrator to securely manage a baseband management controller of a server without a wired connection. The authentication process includes a second challenge for added security. After a mobile device is authenticated, the controller can be managed using an application on the device that utilizes wireless low energy. Reference to wireless low energy or Bluetooth low energy can mean specifically Bluetooth low energy or any similar protocol used. Thus, this term is not meant to be limited to any one specific low energy wireless protocol.

A system can receive, at a mobile device, a unique identifier of a dongle attached to a server that enables wireless communication. The device can establish a wireless low energy connection with the dongle without paring, such that the low energy connection is a Bluetooth protocol layer linking. Then, the device can receive a server unique identifier from a baseband management controller of the server and can determine whether the server has previously been authenticated to yield a determination. When the determination is that the server has not previously been authenticated, the system can receive a baseband management controller username and a password. When the determination is that the server has previously been authenticated, the system can determine whether to perform a double authentication to yield a second determination. When the second determination indicates that the double authentication should be performed, the system can perform the double authentication and can establish a management connection that enables the mobile device to manage the server via a management protocol layer. When the second determination indicates that the double authentication should not be performed, the system can establish the management connection that enables the mobile device to manage the server via the management protocol layer without the double authentication.

A system can transmit, to a mobile device from a server, a unique identifier of a dongle attached to a server that enables wireless communication. The system can establish a wireless low energy connection with the mobile device without paring. Next, the system can transmit a server unique identifier to the mobile device and can determine whether the server has previously been authenticated to yield a determination. When the determination is that the server has not previously been authenticated the server can transmit a baseband management controller username and a password. When the determination is that the server has previously been authenticated, the system can determine whether to perform a double authentication to yield a second determination. When the second determination indicates that the double authentication should be performed, the system can perform the double authentication and can establish a management connection that enables the mobile device to manage the server via a management protocol layer. When the second determination indicates that the double authentication should not be performed, the system can establish the management connection that enables the mobile device to manage the server via the management protocol layer.

Double authentication of the device can be performed using one of a near-field communication authorization and a button authorization. In other words, the double authentication can be performed using just near-field communication authorization. Or, the double authentication can be performed using just a button authorization. Alternately, the double authentication can require both types. Other types of double authentication are also contemplated such as voice, voice print, fingerprint, private data usage, or any other type of authentication can be applicable here. The system can perform near-field communication authorization using a mobile device by transmitting, to the baseband management controller of the server, a management connection requirement from an application on the mobile device. The baseband management controller can transmit a generated key to the application and can receive a key from the application such that a management connection can be established with the application when the generated key matches the key. Near-field communication is performed using a server by receiving, at the baseband management controller of the server, a management connection requirement from an application on the mobile device. The baseband management controller can transmit a generated key to the application and can receive a key from the application such that a management connection can be established with the application when the generated key matches the key.

A system can perform double authentication using button authorization on a mobile device by transmitting, to the baseband management controller of the server, a management connection requirement from an application on the mobile device. The baseband management controller can establish or control a blinking light emitting diode such that a management connection can be established with the application in response to a button press from the user associated with the blinking diode. Button authorization at a server is performed by receiving, at the baseband management controller of the server, a management connection requirement from an application on the mobile device. The baseband management controller can establish a blinking light emitting diode such that a management connection can be established with the application in response to a button press from the user associated with the blinking diode.

DETAILED DESCRIPTION

A system, method and computer-readable media are disclosed which perform Bluetooth low energy double authentication between a mobile device and server nodes.

Various embodiments of the disclosure are described in detail below. While specific implementations are described, it should be understood that this is done for illustration purposes only. Other components and configurations may be used without parting from the spirit and scope of the disclosure.

The present disclosure addresses Bluetooth low energy double authentication (or any other wireless protocol) between a mobile device and server nodes. A system, method and computer-readable media are disclosed which perform Bluetooth low energy double authentication between a mobile device and server nodes. A brief introductory description of a basic general purpose system or computing device in FIG. 1 which can be employed to practice the concepts is disclosed herein. A more detailed description of Bluetooth low energy double authentication between a mobile device and server nodes will then follow.

Near-field communication (NFC) is a form of wireless communication between devices such as smartphones and tablets that employs electromagnetic radio fields. Near-field communication allows a user to wave a device such as a smartphone, over a NFC compatible device and send information without needing to touch or connect with a wire. NFC can be used to checkout at a grocery store, share games with a friend or to tour a museum. Benefits of utilizing NFC to transmit information include convenience, security and speed. Bluetooth low energy double authentication between a mobile device and server nodes utilizes NFC such that a mobile device can manage one or more server nodes without a wired connection.

These variations shall be described herein as the various embodiments are set forth. The disclosure now turns to FIG. 1.

Figure 1:
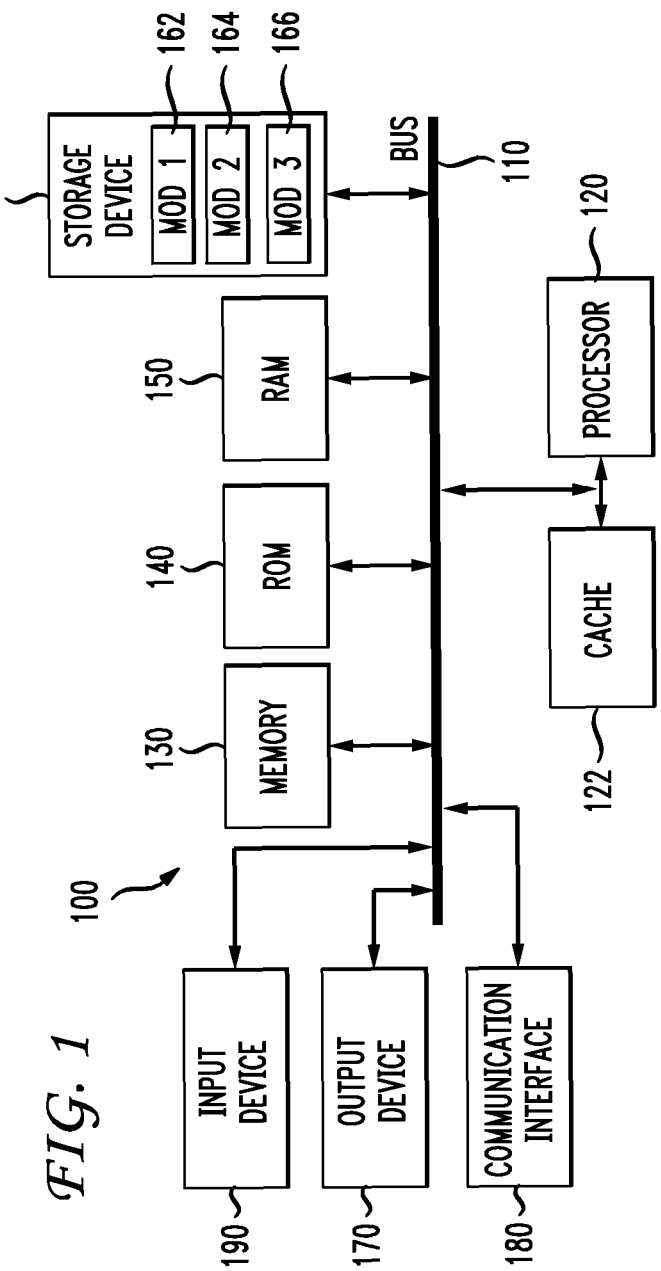
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
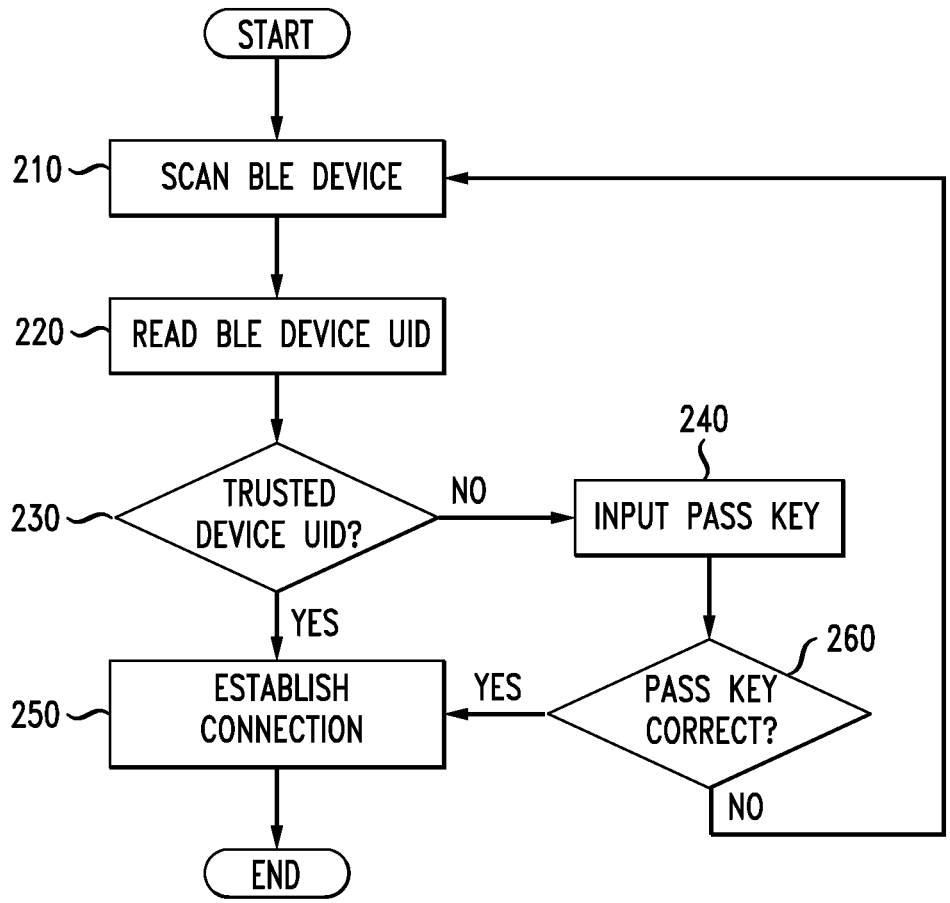
FIG. 2 illustrates a Bluetooth low energy authentication system.

Having disclosed some components of a computing system, the disclosure now turns to FIG. 2, which illustrates a basic Bluetooth low energy authentication system. Traditionally, authentication between devices employing Bluetooth low energy is simple, requiring only a passkey when a device is not considered trusted. Such a simple authentication system can allow system attackers an easy target. Authentication between a mobile device and another Bluetooth device, such as a hands-free headset, using the traditional method begins with the mobile device scanning the Bluetooth low energy device 210. The Bluetooth low energy device unique identifier is read 220 by the mobile device and the system determines whether or not the device is trusted based on the identifier 230. When the device is considered trusted, a connection is established 250 without any other authentication steps. When the device is not considered trusted, a passkey is required 240. The devices can establish a connection when a valid passkey is entered 260. If the passkey is incorrect, the authentication process begins again 210. In this way, the mobile device can authenticate the hands-free headset.

Figure 3:
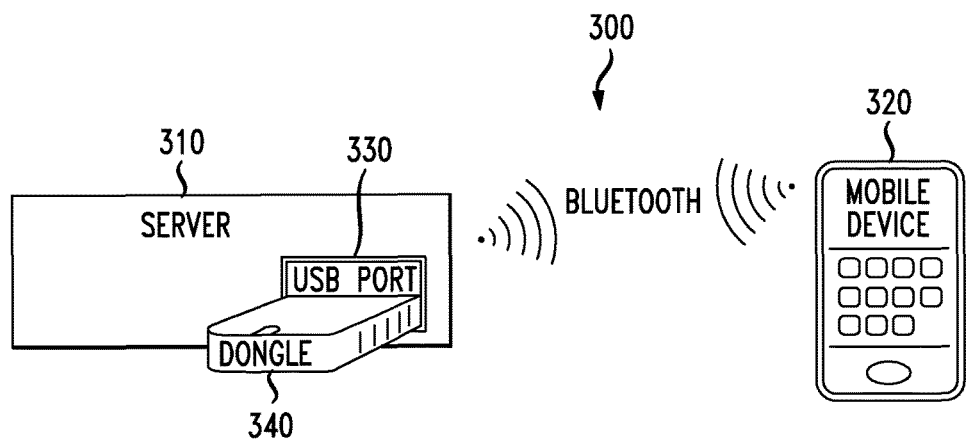
FIG. 3 illustrates a Bluetooth low energy double authentication system.

FIG. 3 illustrates a Bluetooth low energy double authentication system. The system 300 can include a server 310 and mobile device 320 which communicate via a Bluetooth low energy connection. The server can include a universal serial bus (USB) port 330 and a USB dongle 340 that utilizes Bluetooth low energy and near-field communication. The mobile device in a Bluetooth low energy double authentication system can authenticate one or more server nodes, allowing an administrator to manage one or more servers using the mobile device.

Figure 4:
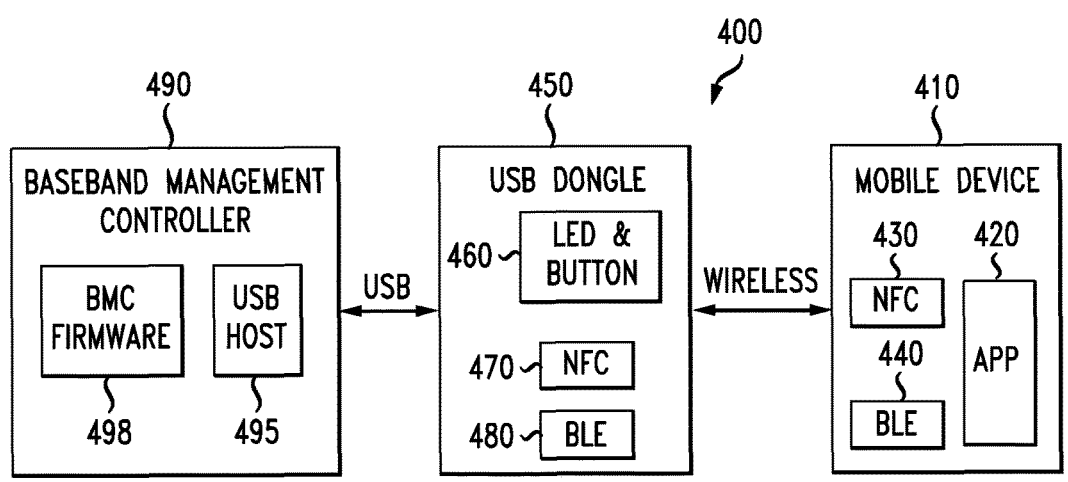
FIG. 4 illustrates Bluetooth low energy double authentication system.

FIG. 4 illustrates a detailed Bluetooth low energy double authentication system 400. The system 400 can include a mobile device 410 that includes an application 420 for controlling one or more server nodes 310, a near-field communication node 430 and Bluetooth low energy 440. The mobile device can connect to a dongle 450 that includes a light emitting diode (LED) and button 460, a near-field communication node 470 and Bluetooth low energy 480. A dongle is a piece of hardware that attaches to an electronic device to allow additional functions, such as security or data. The dongle is connected to a baseband management controller 490 of a server via a universal serial bus (USB) connection that is controlled by the USB host 495 on the server.

Figure 5:
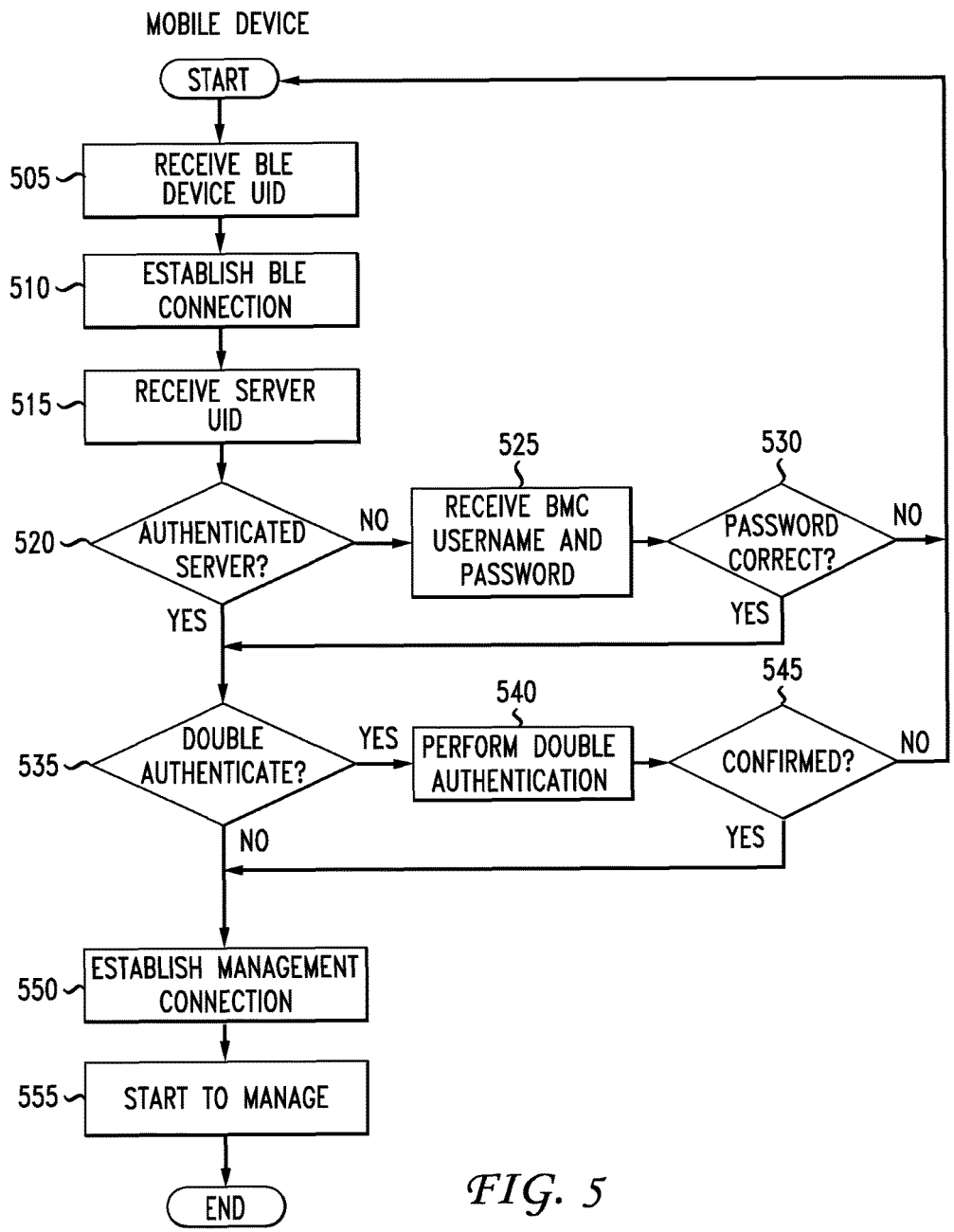
FIG. 5 illustrates Bluetooth low energy double authentication on a mobile device.

Both a mobile device centric embodiment and a server embodiment are disclosed herein. FIG. 5 illustrates Bluetooth low energy double authentication on a mobile device. A mobile device such as a smartphone or tablet can receive a unique identifier of a dongle attached to a server that enables wireless communication 505. The dongle communicates with the server via a USB connection. The system can establish a wireless low energy connection with the dongle without paring 510. The wireless low energy connection is a Bluetooth protocol layer linking. The mobile device can receive a server unique identifier from a baseband management controller of the server after establishing a connection with the dongle 515. The mobile device can determine whether the server has previously been authenticated to yield a determination 520. When the determination is that the server has not previously been authenticated, the mobile device can receive a baseband management controller username and a password 525. When the determination is that the server has previously been authenticated 520, or determines that the received username and password at step 525 are both correct 530, the mobile device can determine whether to perform a double authentication to yield a second determination 535. If one of the received username and password at step 525 is incorrect 530, the authentication process begins again 505. When the second determination indicates that the double authentication should be performed, the system can perform the double authentication 540. The double authentication can be performed using one of near-field communication authorization and a button authorization. When the authentication is valid 545, the system can establish a management connection 550 that enables the mobile device to manage the server via a management protocol layer 555. When the authentication is not valid 545, the authentication process begins again 505.

Figure 6:
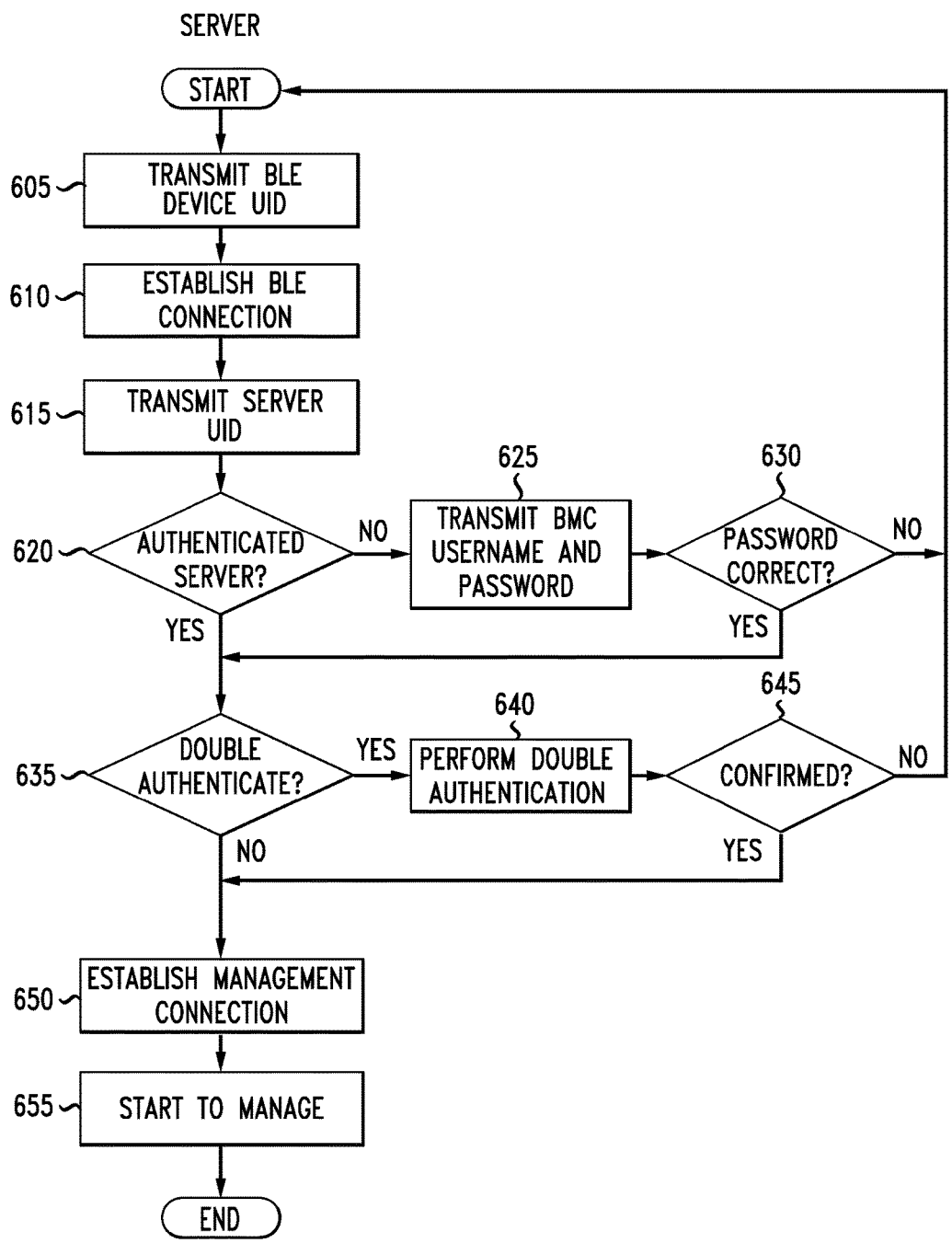
FIG. 6 illustrates Bluetooth low energy double authentication on a server.

FIG. 6 illustrates Bluetooth low energy double authentication on a server. A server can transmit a unique identifier of a dongle attached to the server that enables wireless communication 605. The dongle communicates with the server via a USB connection. The system can establish a wireless low energy connection with the dongle without paring 610. The wireless low energy connection is a Bluetooth protocol layer linking. The server can transmit a server unique identifier from a baseband management controller of the server after establishing a connection with the dongle 615. The mobile device can determine whether the server has previously been authenticated to yield a determination 620. When the determination is that the server has not previously been authenticated, the server can transmit a baseband management controller username and a password 625. When the determination is that the server has previously been authenticated, or determines that the received username and password at step 625 are both correct 630, the system can determine whether to perform a double authentication to yield a second determination 635. If one of the received username and password at step 625 is incorrect 630, the authentication process begins again 605. When the second determination indicates that the double authentication should be performed, the system can perform the double authentication 640. The double authentication can be performed using one of near-field communication authorization and a button authorization. When the authentication is valid 645, the system can establish a management connection 650 that enables the mobile device to manage the server via a management protocol layer 655. When the authentication is not valid 645, the authentication process begins again 505.

Near-field communication authorization is performed on a mobile device 410 by transmitting, to the baseband management controller Firmware 498 of baseband management controller 490 of the server 310, a management connection requirement from an application 420 on the mobile device. The baseband management controller transmits a generated key to the application and receives a key from the application. A management connection can be established with the application when the generated key matches the key.

Near-field communication authorization is performed on a server 490 by receiving, at the baseband management controller Firmware 498 of baseband management controller 490 of the server 310, a management connection requirement from an application 420 on the mobile device. The baseband management controller transmits a generated key to the application and receives a key from the application. A management connection can be established with the application when the generated key matches the key.

Button authorization is performed on a mobile device 410 by transmitting, to the baseband management controller Firmware 498 of baseband management controller 490 of the server 310, a management connection requirement from an application 420 on the mobile device. The baseband management controller establishes a blinking light emitting diode 460 such that a management connection can be established with the application in response to a button press 460 from the user associated with the blinking diode.

Button authorization is performed on a server by receiving, at the baseband management controller Firmware 498 of baseband management controller 490 of the server 310, a management connection requirement from an application 420 on the mobile device. The baseband management controller establishes a blinking light emitting diode 460 such that a management connection can be established with the application in response to a button press 460 from the user associated with the blinking diode.

Figure 7:
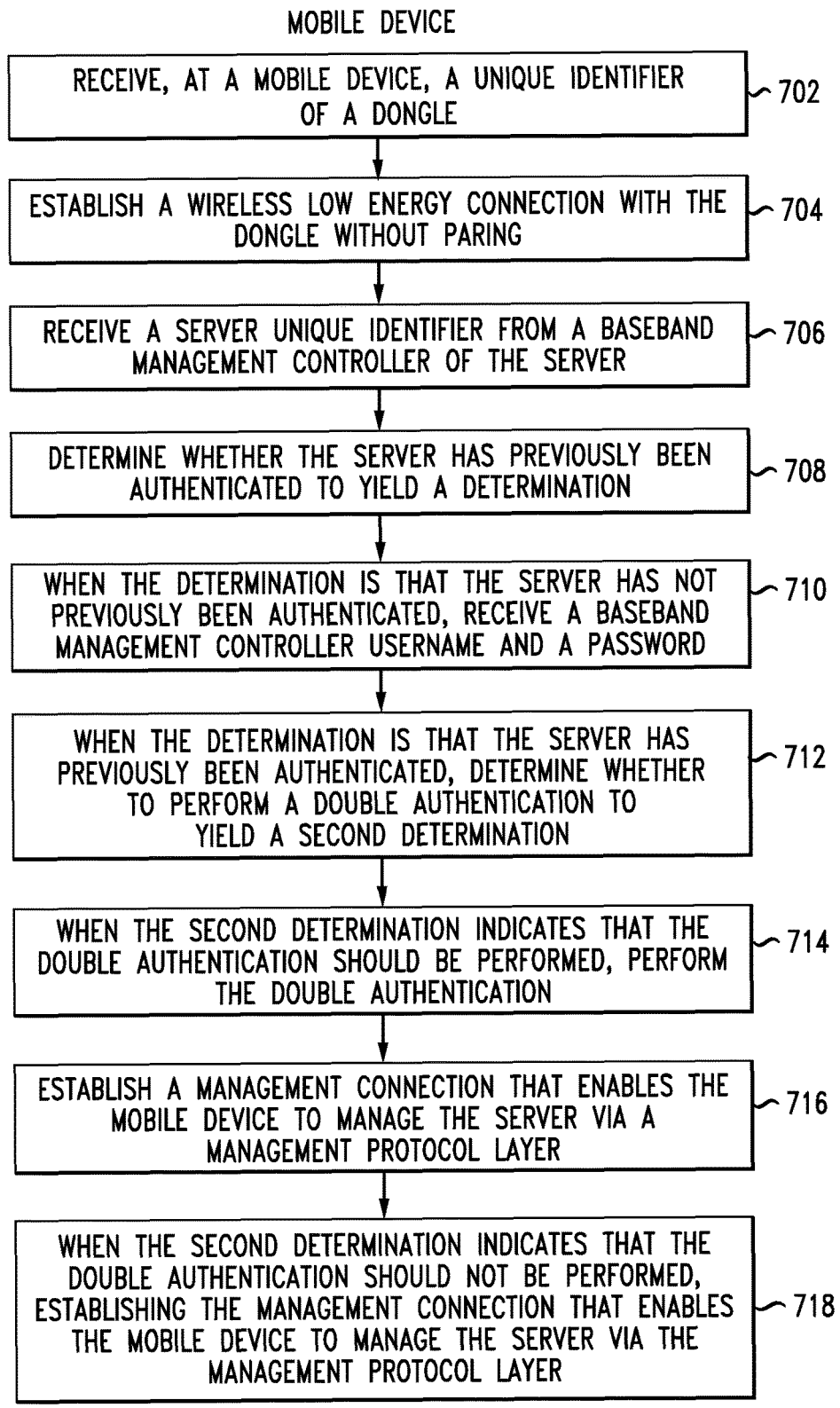
FIG. 7 illustrates a Bluetooth low energy double authentication method embodiment.

Having disclosed some basic system components and concepts, the disclosure now turns to the exemplary method embodiment shown in FIG. 7. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

FIG. 7 illustrates a Bluetooth low energy double authentication method embodiment on a mobile device. A mobile device can receive a unique identifier of a dongle attached to a server that enables wireless communication (702). The mobile device can establish a wireless low energy connection with the dongle without paring (704). Next, the mobile device can receive a server unique identifier from a baseband management controller of the server (706). The device can determine whether the server has previously been authenticated to yield a determination (708). When the determination is that the server has not previously been authenticated, the mobile device can receive a baseband management controller username and a password (710). When the determination is that the server has previously been authenticated, the mobile device can determine whether to perform a double authentication to yield a second determination (712). When the second determination indicates that the double authentication should be performed, the mobile device can perform the double authentication (714) and can establish a management connection that enables the mobile device to manage the server via a management protocol layer (716). When the second determination indicates that the double authentication should not be performed, establishing the management connection that enables the mobile device to manage the server via the management protocol layer (718).

Figure 8:
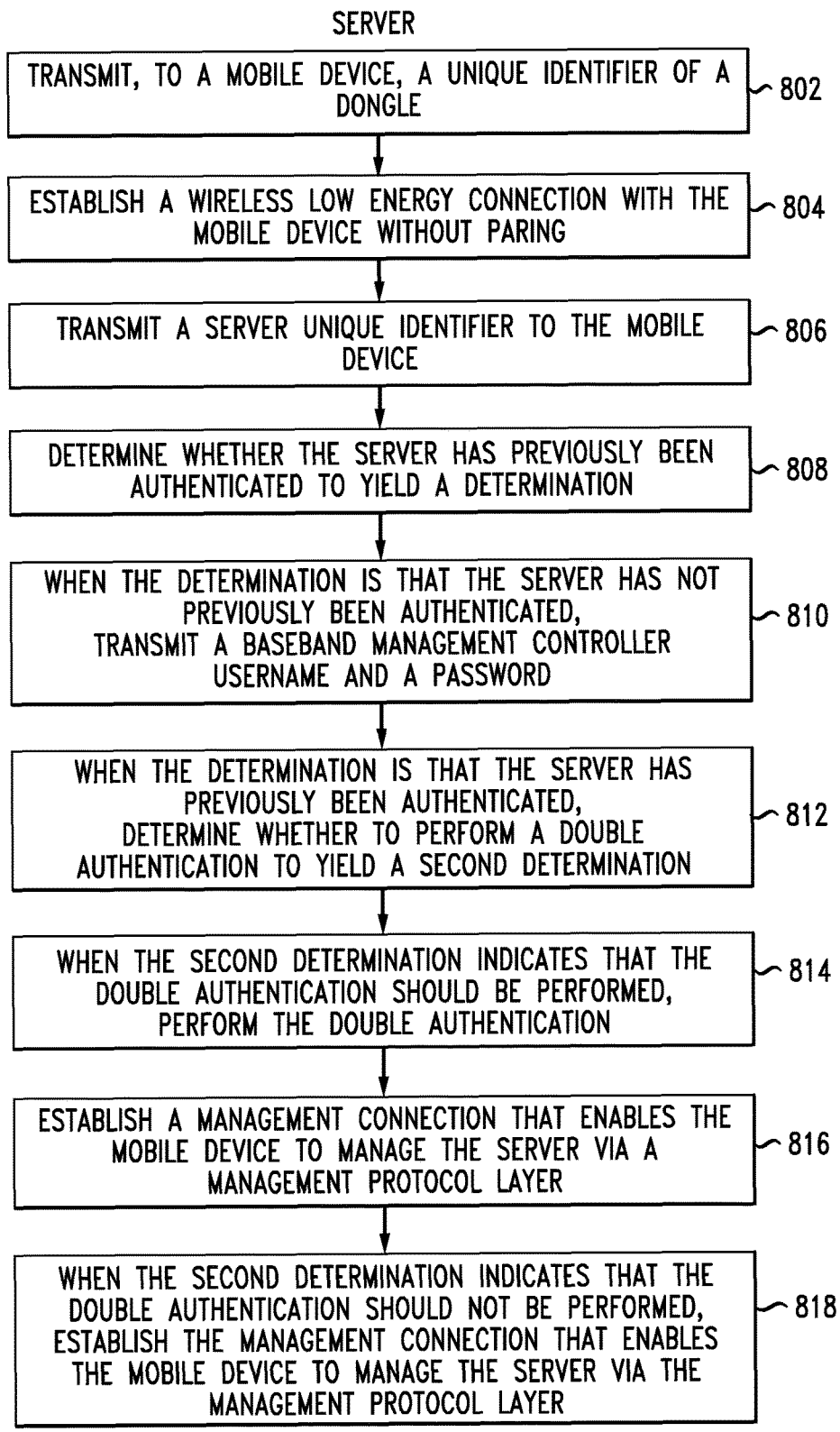
FIG. 8 illustrates a Bluetooth low energy double authentication method embodiment on a server.

FIG. 8 illustrates a Bluetooth low energy double authentication method embodiment on a server. A server can transmit, to a mobile device, a unique identifier of a dongle attached to the server that enables wireless communication (802). The server can establish a wireless low energy connection with the mobile device without paring (804). Next, the server can transmit a server unique identifier to the mobile device (806). The mobile device can determine whether the server has previously been authenticated to yield a determination (808). When the determination is that the server has not previously been authenticated, the server can transmit a baseband management controller username and a password (810). When the determination is that the server has previously been authenticated, the mobile device can determine whether to perform a double authentication to yield a second determination (812). When the second determination indicates that the double authentication should be performed, the mobile device can perform the double authentication (814) and can establish a management connection that enables the mobile device to manage the server via a management protocol layer (816). When the second determination indicates that the double authentication should not be performed, the mobile device can establish the management connection that enables the mobile device to manage the server via the management protocol layer (818).

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   (1) receiving, at a mobile device, a unique identifier of a dongle attached to a server that enables wireless communication;
   (2) establishing a wireless low energy connection with the dongle without paring;
   (3) receiving a server unique identifier from a baseband management controller (BMC) of the server through the wireless low energy connection;
   (4) determining whether the server has previously been authenticated to yield a determination based upon the server unique identifier from the BMC;
   (5) when the determination is that the server has not previously been authenticated, receiving a baseband management controller username and a password; and
   (6) when the determination is that the server has previously been authenticated:
      (a) determining whether to perform a double authentication to yield a second determination;
      (b) when the second determination indicates that the double authentication should be performed:
         (i) performing the double authentication based upon information communicated through the wireless low energy connection; and
         (ii) establishing a management connection between the mobile device and the server that enables the mobile device to manage the server via a management protocol layer;
      (c) when the second determination indicates that the double authentication should not be performed, establishing the management connection between the mobile device and the server that enables the mobile device to manage the server via the management protocol layer.

2. The method of claim 1, wherein the double authentication is performed using one of a near-field communication authorization and a button authorization.

3. The method of claim 2, wherein the near-field communication authorization comprises:
   transmitting, to the baseband management controller of the server, a management connection requirement from an application on the mobile device, wherein the baseband management controller transmits a generated key to the application and receives a key from the application such that a management connection can be established with the application when the generated key matches the key.

4. The method of claim 2, wherein the button authorization comprises:
   transmitting, to the baseband management controller of the server, a management connection requirement from an application on the mobile device; wherein the baseband management controller establishes a blinking light emitting diode such that a management connection can be established with the application in response to a button press from the user associated with the blinking diode.

5. The method of claim 1, wherein the wireless low energy connection is a Bluetooth protocol layer linking.

6. The method of claim 1, wherein the dongle communicates with the server via a universal serial bus connection.

7. The method of claim 6, wherein the dongle includes a light emitting diode, a button, near-field communication and Bluetooth wireless low energy.

8. A system comprising:
   a processor; and a computer-readable storage medium having instructions stored which, when executed by the processor, cause the processor to perform operations comprising:
(1) receiving, at a mobile device, a unique identifier of a dongle attached to a server that enables wireless communication;
(2) establishing a wireless low energy connection with the dongle without paring;
(3) receiving a server unique identifier from a baseband management controller (BMC) of the server through the wireless low energy connection;
(4) determining whether the server has previously been authenticated to yield a determination based upon the server unique identifier from the BMC;
(5) when the determination is that the server has not previously been authenticated, receiving a baseband management controller username and a password; and
(6) when the determination is that the server has previously been authenticated:
(a) determining whether to perform a double authentication to yield a second determination;
(b) when the second determination indicates that the double authentication should be performed:
(i) performing the double authentication based upon information communicated through the wireless low energy connection; and
(ii) establishing a management connection between the mobile device and the server that enables the mobile device to manage the server via a management protocol layer;
(c) when the second determination indicates that the double authentication should not be performed, establishing the management connection between the mobile device and the server that enables the mobile device to manage the server via the management protocol layer.

9. The system of claim 8, wherein the double authentication is performed using one of a near-field communication authorization and a button authorization.

10. The system of claim 9, wherein the near-field communication authorization comprises:
transmitting, to the baseband management controller of the server, a management connection requirement from an application on the mobile device, wherein the baseband management controller transmits a generated key to the application and receives a key from the application such that a management connection can be established with the application when the generated key matches the key.

11. The system of claim 9, wherein the button authorization comprises:
transmitting, to the baseband management controller of the server, a management connection requirement from an application on the mobile device; wherein the baseband management controller establishes a blinking light emitting diode such that a management connection can be established with the application in response to a button press from the user associated with the blinking diode.

12. The system of claim 8, wherein the wireless low energy connection is a Bluetooth protocol layer linking.

13. The system of claim 8, wherein the dongle communicates with the server via a universal serial bus connection.

14. The system of claim 13, wherein the dongle includes a light emitting diode, a button, near-field communication and Bluetooth wireless low energy.

15. A non-transitory computer-readable storage medium having instructions stored which, when executed by a processor, cause the processor to perform operations comprising:
(1) receiving, at a mobile device, a unique identifier of a dongle attached to a server that enables wireless communication;
(2) establishing a wireless low energy connection with the dongle without paring;
(3) receiving a server unique identifier from a baseband management controller (BMC) of the server through the wireless low energy connection;
(4) determining whether the server has previously been authenticated to yield a determination based upon the server unique identifier from the BMC;
(5) when the determination is that the server has not previously been authenticated, receiving a baseband management controller username and a password; and
(6) when the determination is that the server has previously been authenticated:
(a) determining whether to perform a double authentication to yield a second determination;
(b) when the second determination indicates that the double authentication should be performed:
(i) performing the double authentication based upon information communicated through the wireless low energy connection; and
(ii) establishing a management connection between the mobile device and the server that enables the mobile device to manage the server via a management protocol layer;
(c) when the second determination indicates that the double authentication should not be performed, establishing the management connection between the mobile device and the server that enables the mobile device to manage the server via the management protocol layer.

16. The non-transitory computer-readable storage medium of claim 15, wherein the double authentication is performed using one of a near-field communication authorization and a button authorization.

17. The non-transitory computer-readable storage medium of claim 16, wherein the near-field communication authorization is performed by operations comprising:
transmitting, to the baseband management controller of the server, a management connection requirement from an application on the mobile device, wherein the baseband management controller transmits a generated key to the application and receives a key from the application such that a management connection can be established with the application when the generated key matches the key.

18. The non-transitory computer-readable storage medium of claim 16, wherein the button authorization is performed by operations comprising:
transmitting, to the baseband management controller of the server, a management connection requirement from an application on the mobile device; wherein the baseband management controller establishes a blinking light emitting diode such that a management connection can be established with the application in response to a button press from the user associated with the blinking diode.

19. The non-transitory computer-readable storage medium of claim 15, wherein the wireless low energy connection is a Bluetooth protocol layer linking.

20. The non-transitory computer-readable storage medium of claim 15, wherein the dongle communicates with the server via a universal serial bus connection.

\* \* \* \* \*